United States Patent
Hayashi et al.

(10) Patent No.: US 10,793,930 B2
(45) Date of Patent: Oct. 6, 2020

(54) FERRITIC-AUSTENITIC TWO-PHASE STAINLESS STEEL MATERIAL AND METHOD FOR MANUFACTURING SAME

(71) Applicant: NIPPON STEEL & SUMIKIN STAINLESS STEEL CORPORATION, Tokyo (JP)

(72) Inventors: Atsutaka Hayashi, Tokyo (JP); Nobuhiko Hiraide, Tokyo (JP); Junichi Hamada, Tokyo (JP)

(73) Assignee: NIPPON STEEL & SUMIKIN STAINLESS STEEL CORPORATION, Tokyo (JP)

(*) Notice: Subject to any disclaimer, the term of this patent is extended or adjusted under 35 U.S.C. 154(b) by 46 days.

(21) Appl. No.: 15/998,964

(22) PCT Filed: Feb. 14, 2017

(86) PCT No.: PCT/JP2017/005325
§ 371 (c)(1),
(2) Date: Aug. 17, 2018

(87) PCT Pub. No.: WO2017/141907
PCT Pub. Date: Aug. 24, 2017

(65) Prior Publication Data
US 2019/0300980 A1     Oct. 3, 2019

(30) Foreign Application Priority Data

Feb. 17, 2016  (JP) ................. 2016-028391

(51) Int. Cl.

| | | |
|---|---|---|
| *C21D 9/46* | (2006.01) | |
| *C21D 6/00* | (2006.01) | |
| *C21D 8/02* | (2006.01) | |
| *C22C 38/00* | (2006.01) | |
| *C22C 38/02* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/52* | (2006.01) | |
| *C22C 38/54* | (2006.01) | |
| *C22C 38/58* | (2006.01) | |
| *C21D 1/26* | (2006.01) | |
| *C22C 38/04* | (2006.01) | |
| *C21D 9/08* | (2006.01) | |

(Continued)

(52) U.S. Cl.
CPC .............. *C21D 9/46* (2013.01); *C21D 1/26* (2013.01); *C21D 6/004* (2013.01); *C21D 6/005* (2013.01); *C21D 6/007* (2013.01); *C21D 6/008* (2013.01); *C21D 8/0205* (2013.01); *C21D 8/0247* (2013.01); *C21D 9/0068* (2013.01); *C21D 9/08* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C22C 38/60* (2013.01); *B23K 35/302* (2013.01); *B23K 35/3033* (2013.01); *B23K 2101/14* (2018.08); *C21D 2211/001* (2013.01); *C21D 2211/005* (2013.01)

(58) Field of Classification Search
CPC ......... C21D 6/004; C21D 6/005; C21D 6/007
See application file for complete search history.

(56) References Cited

U.S. PATENT DOCUMENTS

| | | |
|---|---|---|
| 5,512,239 A | 4/1996 | Fujiwara et al. |
| 5,618,355 A | 4/1997 | Koyama et al. |

(Continued)

FOREIGN PATENT DOCUMENTS

| | | |
|---|---|---|
| CN | 1128052 A | 7/1996 |
| CN | 101765671 A | 6/2010 |

(Continued)

OTHER PUBLICATIONS

International Search Report for PCT/JP2017/005325 dated May 9, 2017.

(Continued)

*Primary Examiner* — Scott R Kastler
(74) *Attorney, Agent, or Firm* — Birch, Stewart, Kolasch & Birch, LLP

(57) ABSTRACT

A steel material contains, in mass %, C: 0.005 to 0.050, N: 0.05 to 0.30, Si: 0.1 to 1.5, Mn: 0.1 to 7.0, P: 0.005 to 0.100, S: 0.0001 to 0.0200, Cr: 18.0 to 28.0, Cu: 0.1 to 3.0, Ni: 0.1 to 8.0, Mo: 0.1 to 5.0, Al: 0.001 to 0.050, B: 0.0001 to 0.0200, and Ca: 0.0001 to 0.0100. An area ratio of an austenitic phase ranges from 30% to 70% and formulae (I) and (II) below are satisfied.

$$1.03 \leq [\% \ Cr^*F]/[\% \ Cr] \leq 1.40 \quad \text{Formula (I)}$$

$$1.05 \leq [\% \ Mn^*A]/[\% \ Mn] \leq 1.80 \quad \text{Formula (II)}$$

[% symbol of an element]: a content of the element in the steel
[% symbol of an element*F]: a content of the element in a ferrite phase
[% symbol of element*A]: a content of the element in the austenitic phase

16 Claims, No Drawings

(51) Int. Cl.
*C21D 9/00* (2006.01)
*C22C 38/60* (2006.01)
*B23K 35/30* (2006.01)
*B23K 101/14* (2006.01)

(56) References Cited

U.S. PATENT DOCUMENTS

| | | |
|---|---|---|
| 6,156,134 A | 12/2000 | Shimizu et al. |
| 10,131,977 B2 | 11/2018 | Hiraide et al. |
| 2007/0163679 A1 | 7/2007 | Fujisawa et al. |
| 2010/0316522 A1* | 12/2010 | Goransson ............. C22C 38/44 420/38 |
| 2011/0176953 A1 | 7/2011 | Hiraide et al. |
| 2011/0293464 A1* | 12/2011 | Abratis ................ C21D 8/0426 420/42 |
| 2012/0031530 A1* | 2/2012 | Takabe .................. C12D 6/004 148/506 |
| 2013/0118650 A1 | 5/2013 | Hatano et al. |
| 2013/0315776 A1 | 11/2013 | Yamada et al. |
| 2017/0175237 A1 | 6/2017 | Matsuhashi et al. |

FOREIGN PATENT DOCUMENTS

| | | |
|---|---|---|
| EP | 1423549 A1 | 6/2004 |
| EP | 1715073 A1 | 10/2006 |
| EP | 1803832 A1 | 7/2007 |
| EP | 2762597 A2 | 8/2014 |
| JP | 3-79742 A | 4/1991 |
| JP | 4-198456 A | 7/1992 |
| JP | 7-292446 A | 11/1995 |
| JP | 11-129078 A | 5/1999 |
| JP | 2000-328142 A | 11/2000 |
| JP | 2003-138900 A | 5/2003 |
| JP | 2004-360035 A | 12/2004 |
| JP | 2006-169622 A | 6/2006 |
| JP | 2008-291282 A | 12/2008 |
| JP | 2010-121208 A | 6/2010 |
| JP | 2012-126992 A | 7/2012 |
| JP | 2012-201960 A | 10/2012 |
| JP | 5170351 B1 | 3/2013 |
| JP | 5206904 B2 | 6/2013 |
| JP | 2013-185231 A | 9/2013 |
| JP | 5366609 B2 | 12/2013 |
| JP | 2014-189825 A | 10/2014 |
| JP | 2015-110828 A | 6/2015 |
| KR | 10-2003-0077239 A | 10/2003 |
| KR | 10-2004-0029141 A | 4/2004 |
| KR | 10-2009-0005252 A | 1/2009 |
| WO | WO 2012/111537 A1 | 8/2012 |
| WO | WO 2014/157104 A1 | 10/2014 |
| WO | WO 2016/013482 A1 | 1/2016 |

OTHER PUBLICATIONS

Sho, "Effect of Austenite Phase Content on Pitting Resistance of Duplex Stainless Steel", Sanyo Technical Report, Jun. 20, 2003, vol. 10, No. 1, pp. 42-47.
Written Opinion of the International Searching Authority for PCT/JP2017/005325 (PCT/ISA/237) dated May 9, 2017.
Homepage of journals, Journal of Japan Institute of Metals, vol. 27, No. 2, 1963, index of articles.
Japanese Office Action, dated May 21, 2019, for corresponding Japanese Application No. 2018-500122, with an English translation.
Mori et al, "Effects of Chromium and Manganese on the Activity of Nitrogen in Austenite", Journal of Japan Institute of Metals, vol. 27, 1963, pp. 49-53 (5 pages), with abstract.
Third Party Observation, dated Apr. 9, 2019, for corresponding Japanese Application No. 2018-500122, with an English translation.
Tsuchida et al., "Effects of Temperature and Strain Rate on Tensile Properties in a Lean Duplex Stainless Steel", Iron and Steel, Japan, vol. 99, No. 8, 2013, pp. 517-523(15-21), with abstract.
Extended European Search Report, dated May 31, 2019, for corresponding European Application No. 17753164.7.
International Preliminary Report on Patentability and English translation of Written Opinion of the International Searching Authority for PCT/JP2017/005325 (PCT/IB/373 and PCT/ISA/237) dated Aug. 21, 2018.
Chinese Office Action and Search Report dated Oct. 22, 2019, for corresponding Chinese Patent Application No. 201780011445.1, with English translation.
Korean Office Action for corresponding Korean Application No. 10-2018-7023743, dated Jul. 20, 2020, with partial English translation.

\* cited by examiner

FERRITIC-AUSTENITIC TWO-PHASE STAINLESS STEEL MATERIAL AND METHOD FOR MANUFACTURING SAME

TECHNICAL FIELD

The present invention relates to a ferritic-austenitic duplex stainless steel material and a method of producing the same, the ferritic-austenitic duplex stainless steel material being suitable for an in-vehicle part having a material temperature of 400 degrees C. or less in use and a part joined thereto or for a to-be-brazed part.

BACKGROUND ART

Transport machines, such as automobile, bus, truck, motor cycle, construction vehicle, agriculture vehicle, industrial vehicle, and railway vehicle, have recently had to be improved in fuel efficiency in view of environmental concerns. As an approach for meeting such a requirement, a reduction in vehicle weight has been actively encouraged. A reduction in vehicle weight is mainly achieved by a reduction in a weight of a material for a part. Specifically, a sheet thickness of the material needs to be reduced, which requires the material to be highly strengthened.

The above vehicles are each equipped with various pipes or channel structure for, for instance, water, oil, air, fuel, exhaust gas, and hydrogen. Materials for such parts also need to be reduced in weight. For pipe or channel structure intended to be used in an environment not requiring so much heat resistance where the material temperature is 400 degrees C. or less in use or for pipe or channel structure for hydrogen intended to be used in a non-high pressure hydrogen environment not requiring so much resistance to hydrogen embrittlement, a material such as austenitic stainless steel, surface-treated steel sheet, and copper alloy is sometimes used in view of corrosion resistance and workability. Ferritic-austenitic duplex stainless steel can be considered as an example of a high-strength material maintaining corrosion resistance comparable to or higher than those of the above materials. Further, in comparing a ferritic-austenitic duplex stainless steel and an austenitic stainless steel in steel grades comparable in terms of corrosion resistance, the ferritic-austenitic duplex stainless steel contains less Ni and Mo, allowing for cost reduction and, consequently, prevalence of a more fuel-efficient vehicle if the cost reduction is reflected to the price of the vehicle.

A variety of parts for purposes such as tightening, fixation and protection may be joined to the above-described pipe or channel structure at a plurality of portions. Further, by joining pipes to each other or joining parts for assembly of the channel structure, the joint configuration is sometimes necessarily complicated. Since brazing is suitable for such joining at a plurality of portions or joining resulting in the complicated joint configuration, brazing is frequently performed on the above-described pipe or channel structure. For brazing the above-described pipe or channel structure, Cu brazing filler metal or Ni brazing filler metal is usually used. Herein, the Cu brazing filler metal means a pure Cu brazing filler metal and a filler alloy consisting mainly of Cu and the Ni brazing filler metal means a pure Ni brazing filler metal and a filler alloy consisting mainly of Ni. Cu brazing or Ni brazing is performed by a heat treatment under a hydrogen atmosphere or in a vacuum at a temperature ranging approximately from 1000 degrees C. to 1200 degrees C.

Accordingly, to put ferritic-austenitic duplex stainless steel into use as a steel material for the above-described pipe or channel structure, brazeability should be considered.

Further, the material itself is required to exhibit corrosion resistance even after a brazing heat treatment. Performing the heat treatment on the ferritic-austenitic duplex stainless steel with a large N content may cause an unbalanced phase ratio between the ferrite phase and the austenitic phase, formation of nitride, and/or reduction in corrosion resistance due to occurrence of denitrification.

Further, in the use of ferritic-austenitic duplex stainless steel for parts being joined to the above-described pipe or channel structure for a purpose such as tightening, fixation and protection, the above problems, i.e., brazeability and corrosion resistance after a brazing heat treatment, need to be considered.

Patent Literatures 1, 2 and 3 disclose ferritic-austenitic duplex stainless steels intended for, for instance, oil well pipe for oil and natural gas, line pipe, dam, floodgate, material for vacuum equipment, material for desalination, and pipe and heat exchanger for oil refinery plant and chemical industrial plant. The above parts for which the stainless steel can be used are large in size and thus usually made of heavy plate, large-diameter pipe or casting, so that brazing is not suitable as a joining method. Accordingly, none of Patent Literatures 1, 2 and 3 discusses brazeability and corrosion resistance after a brazing heat treatment. Further, the content of each element in the steel is disclosed but not the element concentration in each phase.

Patent Literature 4 discloses a ferritic-austenitic duplex stainless steel for an automobile molding material. Patent Literature 5 discloses a ferritic-austenitic duplex stainless steel for a fuel tank. However, neither of these patent literatures, which are intended for automobile parts, discusses brazeability and corrosion resistance after a brazing heat treatment. Further, the content of each element in the steel is disclosed but not the element concentration in each phase.

Patent Literature 6 discloses a ferritic-austenitic duplex stainless steel that exhibits an excellent press formability. Patent Literature 7 discloses a ferritic-austenitic duplex stainless steel that exhibits an excellent embrittlement resistance in manufacturing a product, welding and heat treatment. However, neither of these patent literatures, which are intended for a thin plate or a small-diameter pipe, discusses brazeability and corrosion resistance after a brazing heat treatment. Further, the content of each element in the steel is disclosed but not the element concentration in each phase.

Patent Literature 8 discloses a high-strength multiphase stainless steel sheet that exhibits an excellent shape freezability. However, this patent literature, which discloses the steel sheet intended for a shock-absorbing member for automobiles, does not discuss brazeability and corrosion resistance after a brazing heat treatment. Further, the content of each element in the steel is disclosed but not the element concentration in each phase.

CITATION LIST

Patent Literature(S)

Patent Literature 1 JP 5170351 B2
Patent Literature 2 JP 2015-110828 A
Patent Literature 3 JP 5366609 B2
Patent Literature 4 JP 4-198456 A
Patent Literature 5 JP 2012-126992 A
Patent Literature 6 JP 2013-185231 A Patent Literature 7 JP 2014-189825 A
Patent Literature 8 JP 2008-291282 A

SUMMARY OF THE INVENTION

Problem(s) to be Solved by the Invention

None of Patent Literature 1 to Patent Literature 8 discusses brazeability and corrosion resistance after a brazing heat treatment. Further, the content of each element in the steel is disclosed but not the element concentration in each phase.

As described above, the use of ferritic-austenitic duplex stainless steel, which has high strength and high corrosion resistance, is expected to be useful for an in-vehicle pipe or channel structure for a substance such as water, oil, air, fuel, exhaust gas, and normal-pressure hydrogen with a temperature of 400 degrees C. or less and a part joined thereto for tightening, fixation and protection or for a part being brazed so that the weights of the above parts are reduced to improve fuel efficiency. However, the typical techniques do not address brazeability and corrosion resistance after a brazing heat treatment. Accordingly, a technique for improving ferritic-austenitic duplex stainless steel in terms of brazeability and corrosion resistance after a brazing heat treatment has needed to be developed.

In view of the above, an object of the invention is to provide a ferritic-austenitic duplex stainless steel material and method of producing the same, the ferritic-austenitic duplex stainless steel material being excellent in brazeability and corrosion resistance after a brazing heat treatment.

Means for Solving the Problem(s)

To solve the above problems, the inventors have intently studied the influences of an area ratio of the austenitic phase and respective contents of elements in each phase on the brazeability of a ferritic-austenitic duplex stainless steel and the corrosion resistance thereof after a brazing heat treatment. As a result, it has been found that the area ratio of the austenitic phase, a Cr content in the ferrite phase, an Mn content in the austenitic phase affect the brazeability and corrosion resistances before and after a brazing heat treatment.

It has also been found that the area ratio in the austenitic phase and the respective contents of elements in each phase can be controlled by controlling conditions for final annealing in a method of producing a steel sheet and a steel pipe, such as finish annealing after cold rolling or finish annealing after pipe making.

Further, as a result of intent studies on the influence of each component, the inventors have developed a ferritic-austenitic duplex stainless steel sheet excellent in brazeability and corrosion resistance after a brazing heat treatment and a method of producing the same.

A summary of the invention capable of achieving the above object is as follows.

(1) A ferritic-austenitic duplex stainless steel material contains, in mass %, C: 0.005% to 0.050%, N: 0.05% to 0.30%, Si: 0.1% to 1.5%, Mn: 0.1% to 7.0%. P: 0.005% to 0.100%, S: 0.0001% to 0.0200%, Cr: 18.0% to 28.0%, Cu: 0.1% to 3.0%, Ni: 0.1% to 8.0%, Mo: 0.1% to 5.0%, Al: 0.001% to 0.050%, B: 0.0001% to 0.0200%, Ca: 0.0001% to 0.0100%, and the balance including Fe and inevitable impurities, in which an austenitic phase has an area ratio ranging from 30% to 70%, and formulae (I) and (II) below are satisfied.

$$1.03 \leq [\% \ Cr*F]/[\% \ Cr] \leq 1.40 \quad \text{Formula (I)}$$

$$1.05 \leq [\% \ Mn*A]/[\% \ Mn] \leq 1.80 \quad \text{Formula (II)}$$

In the formulae, [% symbol of an element] indicates a content (mass %) of the element in the steel, [% symbol of an element*F] indicates a content (mass %) of the element in a ferrite phase, and [% symbol of an element*A] indicates a content (mass %) of the element in the austenitic phase.

(2) In the above aspect, the ferritic-austenitic duplex stainless steel material satisfies at least one of, in mass %, Cr: less than 24.0%, Ni: less than 4.0%, and Mo: less than 1.0%.

(3) In the above aspect, the ferritic-austenitic duplex stainless steel material satisfies, in mass %, Si: at least 0.2%, Mn: less than 4.0%, Cu: less than 1.5%, and Al: at least 0.005%.

(4) In the above aspect, the ferritic-austenitic duplex stainless steel material satisfies, in mass %, Mn: more than 2.7%, Ni: more than 1.8%, and Cu: more than 0.8%.

(5) In the above aspect, the ferritic-austenitic duplex stainless steel material satisfies, in mass %, Si: 0.2% to 1.5%, Mn: more than 2.7% and less than 4.0%, Cr: 18.0% to less than 24.0%, Cu: more than 0.8% and less than 1.5%, Ni: more than 1.8% and less than 4.0%, Mo: 0.2% to less than 1.0%, and Al: 0.005% to 0.050%.

(6) In the above aspect, the ferritic-austenitic duplex stainless steel material further contains, in mass %, one of or two or more of V: 0.001% to 0.5%, Ti: 0.001% to 0.5%, Nb: 0.001% to 0.5%, Zr: 0.001% to 0.5%, Hf: 0.001% to 0.5%, W: 0.1% to 3.0%, Sn: 0.01% to 1.0%, Co: 0.01% to 1.0%, Sb: 0.005% to 0.3%, Ta: 0.001% to 1.0%, Ga: 0.0002% to 0.3%, Mg: 0.0002% to 0.01%, Bi: 0.001% to 1.0%, and REM: 0.001% to 0.2%.

(7) In the above aspect, the ferritic-austenitic duplex stainless steel material is used for an in-vehicle channel part having a material temperature of 400 degrees C. or less in use and a part to be joined to the channel part.

(8) In the above aspect, the ferritic-austenitic duplex stainless steel material is used for a to-be-brazed part.

(9) In the above aspect, the steel material is in a form of a steel sheet or a steel pipe.

(10) A vehicle part is made of a material containing the ferritic-austenitic duplex stainless steel material.

(11) A heat exchanger is made of a material containing the ferritic-austenitic duplex stainless steel material.

(12) A pipe is made of a material containing the ferritic-austenitic duplex stainless steel material.

(13) A channel structure is made of a material containing the ferritic-austenitic duplex stainless steel material.

(14) A method of producing the ferritic-austenitic duplex stainless steel material includes final annealing performed at a temperature of 1200 degrees C. or less. In a temperature-rise process, a time Tu (sec) for a range of 500 degrees C. to 900 degrees C. is 5 seconds to 100 seconds and a time Th (sec) for a range of 900 degrees C. or more is 30 seconds or more. In a cooling process, a time Td (sec) for a range of 900 degrees C. or 500 degrees C. is 1 second to 400 seconds. A formula (III) below is satisfied.

$$0.20 \leq (Tu+Td)/Th \leq 10.00 \quad \text{Formula (III)}$$

According to the above aspects of the invention, a ferritic-austenitic duplex stainless steel material being excellent in brazeability and corrosion resistance after a brazing heat treatment and a method of producing the same can be provided.

Further, according to the aspects of the invention, the ferritic-austenitic duplex stainless steel material with excellent corrosion resistance and high strength can be used for an in-vehicle channel part having a material temperature of 400 degrees C. or less in use and a part joined thereto or used for a to-be-brazed part. The use of the ferritic-austenitic duplex stainless steel material allows for reducing a material thickness and, consequently, a vehicle weight, which significantly contributes to, for instance, environmental measures and cost reduction of parts.

Similarly, the use of the ferritic-austenitic duplex stainless steel material for a to-be-brazed part not for a vehicle allows for reducing a material thickness, which contributes to, for instance, reducing the size of a part, reducing costs, and improving a heat exchange performance.

DESCRIPTION OF EMBODIMENT(S)

An exemplary embodiment of the invention will be described below in detail.

First, description will be made on reasons for limitations on a steel composition of a ferritic-austenitic duplex stainless steel material according to the exemplary embodiment of the invention. In the steel composition, % means mass %. Further, the balance in the steel composition includes Fe and inevitable impurities.

C: 0.005% to 0.050%

C is an element that stabilizes the austenitic phase. However, addition of an excessive amount of C lowers corrosion resistance and toughness. Accordingly, the C content is determined to range from 0.005% to 0.050%. Further, considering that reducing an excessive amount of C increases costs and addition of an excessive amount of C lowers weldability, it is preferable that the lower limit is 0.010% and the upper limit is 0.030%.

N: 0.05% to 0.30%

N is an element that stabilizes the austenitic phase. Further, N is dispersible, so that N accelerates a generation speed of the austenitic phase. However, addition of an excessive amount of N causes formation of nitride, lowering corrosion resistance and toughness. Accordingly, the N content is determined to range from 0.05% to 0.30%. Further, considering that N is an element that enhances the strength of the austenitic phase and corrosion resistance, the lower limit is preferably 0.10%. Considering that addition of an excessive amount of N causes generation of air bubbles and/or surface defect, which is attributed to nitride, at the time of production and lowers productivity, the upper limit is preferably 0.25%. The more preferable lower limit is more than 0.12%. The more preferable upper limit is less than 0.20%.

Si: 0.1% to 1.5%

Si is an element that can be added as a deoxidizer. However, addition of an excessive amount of Si lowers toughness. Accordingly, the N content is determined to range from 0.1% to 1.5%. Further, considering that reduction of an excessive amount of Si results in poor deoxidation and/or increased refining cost and addition of an excessive amount of Si lowers workability, the lower limit is preferably 0.2% and the upper limit is preferably 0.7%.

Mn: 0.1% to 7.0%

Mn, which can be added as a deoxidizer, increases the solubility limit of N to prevent formation of nitride and denitrification. However, addition of an excessive amount of Mn lowers corrosion resistance. Accordingly, the Mn content is determined to range from 0.1% to 7.0%. Further, considering that Mn is an element that stabilizes the austenitic phase, the lower limit is preferably 1.0%. Considering that addition of an excessive amount of Mn lowers hot workability, the upper limit is preferably 5.5%. The more preferable lower limit is more than 2.0%. The more preferable upper limit is less than 4.0%. Mn is also supposed to prevent the austenitic phase ratio from being lowered due to denitrification at the time of a brazing heat treatment, further enhancing filler wettability. Also considering this effect, the most preferable lower limit is more than 2.7%.

P: 0.005% to 0.100%

P is supposed to enhance filler wettability for brazing as described later. However, addition of an excessive amount of P lowers toughness and weldability. Accordingly, the P content is determined to range from 0.005% to 0.100%. Further, the lower limit is preferably 0.010% in view of costs and productivity. The upper limit is preferably 0.050%. The more preferable lower limit is more than 0.015%. The more preferable upper limit is 0.030%.

S: 0.0001% to 0.0200%

S is supposed to reduce denitrification during a brazing heat treatment as described later. However, addition of an excessive amount of S lowers hot workability. Accordingly, the S content is determined to range from 0.0001% to 0.0200%. Further, the lower limit is preferably 0.0003% in view of costs and productivity. The upper limit is preferably 0.0050%. The more preferable lower limit is more than 0.0003%. The more preferable upper limit is 0.0020%.

Cr: 18.0% to 28.0%

Cr is basically an element that enhances corrosion resistance. However, addition of an excessive amount of Cr lowers filler wettability for brazing.

Accordingly, the Cr content is determined to range from 18.0% to 28.0%. Further, considering that Cr is an element that enhances strength, the lower limit is preferably 20.0%. Considering that addition of an excessive amount of Cr increases the alloy cost, the upper limit is preferably 26.0%. The more preferable lower limit is more than 20.0%. The more preferable upper limit is less than 24.0%.

Cu: 0.1% to 3.0%,

Cu is an element effective not only in enhancing corrosion resistance but also in stabilizing the austenitic phase. However, addition of an excessive amount of Cu lowers hot workability. Accordingly, the Cu content is determined to range from 0.1% to 3.0%. Further, considering that addition of an excessive amount of Cu increases the alloy cost, the upper limit is preferably 2.0%. The more preferable lower limit is more than 0.5% and the more preferable upper limit is less than 1.5% In addition, since being compatible with Cu brazing filler metal, Cu is supposed to further enhance filler wettability. Also considering this effect, the most preferable lower limit is more than 0.8%.

Ni: 0.1% to 8.0%

Ni is an element effective not only in enhancing corrosion resistance but also in stabilizing the austenitic phase. However, addition of an excessive amount of Ni lowers the alloy cost. Accordingly, the Ni content is determined to range from 0.1% to 8.0%. Further, considering that Cr is an element that enhances toughness, the lower limit is preferably 1.0%. Meanwhile, the upper limit is preferably 5.0% in view of the alloy cost. The more preferable lower limit is more than 1.5%. The more preferable upper limit is less than 4.0%. In addition, since being compatible with Ni brazing filler metal, Ni is supposed to further enhance filler wettability. Also considering this effect, the most preferable lower limit is more than 1.8%.

Mo: 0.1% to 5.0%

Mo is an element that enhances corrosion resistance. However, addition of an excessive amount of Mo lowers hot workability. Accordingly, the Mo content is determined to range from 0.1% to 5.0%. Further, considering that addition of an excessive amount of Mo increases the alloy cost, the upper limit is preferably 4.0%. The more preferable lower limit is 0.2% or more. The more preferable upper limit is less than 1.0%.

Al: 0.001% to 0.050%

Al is an element that can be added as a deoxidizer. However, Al is supposed to lower filler wettability for brazing as described later. Accordingly, the Al content is determined to range from 0.001% to 0.050%. Further, considering that reduction of an excessive amount of Al results in poor deoxidation and/or increased refining cost and addition of an excessive amount of Al results in lowered weldability, generation of a surface defect attributed to formation of nitride, and lowered toughness, the lower limit is preferably 0.005% and the upper limit is preferably 0.030%.

B: 0.0001% to 0.0200%

B is supposed to reduce denitrification during a brazing heat treatment as described later. B is also an element that enhances hot workability. However, addition of an excessive amount of B lowers weldability. Accordingly, the B content is determined to range from 0.0001% to 0.0200%. Further, the lower limit is preferably 0.0010% and the upper limit is preferably 0.0100% in view of costs and productivity. The more preferable lower limit is more than 0.0010%. The more preferable upper limit is 0.0050% or less.

Ca: 0.0001% to 0.0100%

Ca is an element that enhances hot workability. However, addition of an excessive amount of Ca lowers workability. Accordingly, the Ca content is determined to range from 0.0001% to 0.0100%. Further, the lower limit is preferably 0.0010% in view of costs and productivity. The upper limit is preferably 0.0050%.

According to the exemplary embodiment, the properties can be further improved by further adding one of or two or more of V, Ti, Nb, Zr, Hf, W, Sn, Co, Sb, Ta, Ga, Mg, Bi and REM.

V: 0.001% to 0.5%
Ti: 0.001% to 0.5%
Nb: 0.001% to 0.5%
Zr: 0.001% to 0.5%
Hf: 0.001% to 0.5%

Each of V, Ti, Nb, Zr and Hf, which is an element that enhances hot workability, is bonded to C or N in welding to prevent formation of Cr carbonitride, thus enhancing the intergranular corrosion resistance of the welded portion. However, addition of an excessive amount of such an element results in formation of nitride, causing generation of a surface defect and/or reduction of toughness, so that workability and/or productivity are sometimes lowered. Accordingly, a content of each of the above elements is determined to range from 0.001% to 0.5%.

W: 0.1% to 3.0%
Sn: 0.01% to 1.0%
Co: 0.01% to 1.0%
Sb: 0.005% to 0.3%
Ta: 0.001% to 1.0%
Ga: 0.0002% to 0.3%

Each of W, Sn, Co, Sb, Ta and Ga is an element that enhances corrosion resistance. However, addition of an excessive amount of such an element lowers toughness, workability, weldability and productivity. Accordingly, the W content is determined to range from 0.1% to 3.0%, the Sn content from 0.01% to 1.0%, the Co content from 0.01% to 1.0%, the Sb content from 0.005% to 0.3%, the Ta content from 0.001% to 1.0%, and the Ga content from 0.0002% to 0.3%.

Mg: 0.0002% to 0.01%

Mg, which is sometimes added as a deoxidizer element, makes the slab structure fine, enhancing hot workability and moldability. However, addition of an excessive amount of Mg lowers weldability and surface quality. Accordingly, the Mg content is determined to range from 0.0002% to 0.01%.

Bi: 0.001% to 1.0%

Bi is an element that prevents roping during cold rolling to enhance productivity. However, addition of an excessive amount of Bi lowers hot workability. Accordingly, the Bi content is determined to range from 0.001% to 1.0%.

REM: 0.001% to 0.2%

REM (Rare Earth Metal) is a group of elements that enhances the cleanliness of the steel while enhancing rust resistance and hot workability. However, addition of an excessive amount of REM increases the alloy cost and lowers productivity. Accordingly, the REM content is determined to range from 0.001% to 0.2%. It should be noted that REM refers to elements according to the general definition. Specifically, REM refers to a group of elements consisting of: two elements of scandium (Sc) and yttrium (Y); and fifteen elements (lanthanoid) from lanthanum (La) to lutetium (Lu). REM may be singly added or added in a form of a mixture.

Next, description will be made on an area ratio of the austenitic phase.

To enhance the brazeability of the ferritic-austenitic duplex stainless steel, the filler wettability relative to the steel needs to be enhanced. Each of Cu brazing filler metal and Ni brazing filler metal is more wettable to an austenitic stainless steel than to a ferritic stainless steel. Thus, in the ferritic-austenitic duplex stainless steel, the austenitic phase enhances the wettability and the ferrite phase lowers the wettability, so that the wettability is enhanced with an increase in the area ratio of the austenitic phase. An excessively small area ratio of the austenitic phase results in formation of Cr nitride and, consequently, in lowered corrosion resistance and poor toughness. An excessively large area ratio of the austenitic phase results in lowered stress corrosion cracking resistance. Accordingly, the area ratio of the austenitic phase is determined to range from 30% to 70%. The preferable lower limit is 35% or more. The preferable upper limit is 65% or less.

The area ratio of the austenitic phase of the ferritic-austenitic duplex stainless steel is a value measured using a ferrite scope. The ferrite scope is FERITSCOPE FMP30 manufactured by Helmut Fischer GmbH.

Next, description will be made on the content of each element in each phase.

First of all, to enhance the brazeability of the ferritic-austenitic duplex stainless steel, it is necessary not only to enhance the filler wettability to the steel as a whole as described above but also to enhance the wettability to the ferrite phase, which is inherently poor in wettability. The wettability is lowered by, for instance, an oxide film on a surface of the steel. To eliminate an oxide film of Fe or Cr, brazing is performed in a hydrogen atmosphere or in a vacuum. However, Al in the steel is oxidized even with, for instance, a slight amount of water vapor contained in such an atmosphere and an excessive amount of Cr inhibits elimination of the oxide film, so that the wettability is lowered. Accordingly, reducing the degree of concentration of Cr and Al in the ferrite phase contributes to improving the wettability to the ferritic-austenitic duplex stainless steel.

Meanwhile, both Cr and Al are elements concentrated in the ferrite phase. However, the Al content in the ferrite phase is so small that the Al content is difficult to measure. Accordingly, a relationship between the degree of concentration of Cr in the ferrite phase and the wettability was studied on the assumption that the Al content in the ferrite phase correlates with the degree of concentration of Cr in the ferrite phase. As a result, the applicant has found that a formula (i) needs to be satisfied to improve the wettability.

$$[\% \ Cr*F]/[\% \ Cr] \leq 1.40 \quad \text{Formula (i)}$$

When the filler maintains contact with the steel, a micro-order liquid film phase, which is affected by the steel component(s), is supposed to be formed on a filler-side of an interface between the filler and the steel. The P content in the liquid film phase is supposed to be increased with an increase in the P content in the steel, lowering the melting point to assist the improvement of the wettability. Accordingly, the degree of concentration of P is preferably large.

Further, the Al content in the ferrite phase is preferably small as described above. However, the Al content and the P content in the ferrite phase are so small that the Al content and the P content are difficult to measure.

In this case, the P content and the Al content in the ferrite phase can be determined by the following exemplary method.

Specifically, assuming that the degree of concentration of Cr in the ferrite phase is comparable to those of Al and P, the P content and the Al content in the ferrite phase are determined with reference to the P content and the Al content in the steel and the degree of concentration of Cr in the ferrite phase. In this case, it is more preferable that a formula (ii) below is satisfied.

$$([\% \ P]-[\% \ Al]) \times [\% \ Cr*F]/[\% \ Cr] \geq -0.010 \quad \text{Formula (ii)}$$

In the formula, [% symbol of an element] indicates a content (mass %) of the element in the steel and [% symbol of an element*F] indicates a content (mass %) of the element in the ferrite phase.

It should be noted that the formula (i) and the formula (ii) are both intended to directly/indirectly determine the respective degrees of concentration of Cr, Al and P in the ferrite phase for improvement of the wettability. The Al content and the P content in the ferrite phase are smaller than the Cr content. Thus, the respective degrees of concentration of Al and P, the respective contents of which are difficult to measure, are less influential on the wettability than the degree of concentration of Cr. Thus, the wettability can be enhanced as long as at least the formula (i) is satisfied.

Next, in performing a brazing heat treatment on the ferritic-austenitic duplex stainless steel, it is also important to prevent the corrosion resistance from considerably being lowered after the brazing heat treatment. The maximum temperature for Cu-brazing heat treatment and Ni-brazing heat treatment is approximately 1200 degrees C. or less, which falls within a temperature range where the ferrite phase and the austenitic phase can coexist. Thus, such a heat treatment is not supposed to cause an unbalanced phase ratio between the ferrite phase and the austenitic phase, which may result in considerably lowering the corrosion resistance. Meanwhile, the brazing is performed in a hydrogen atmosphere or in a vacuum, in which N is slightly contained as an impurity or purge gas. The partial pressure of nitrogen is significantly small in either atmosphere, so that the ferritic-austenitic duplex stainless steel, which has a large N content, may experience denitrification. N in the steel is an element effective not only in enhancing the corrosion resistance of the austenitic phase but also in increasing the austenitic phase ratio. Thus, denitrification lowers the corrosion resistance of the austenitic phase and causes a change in the ferrite-austenitic phase ratio, which results in deterioration of a component balance for maintaining a suitable corrosion resistance. Here, Mn in the steel is supposed to reduce the activity of N and increase the solubility limit of N, thus preventing denitrification. Mn is an element concentrated in the austenitic phase. Thus, increasing the degree of concentration of Mn in the austenitic phase contributes to preventing denitrification of the austenitic phase with a large N content. Accordingly, a formula (iii) is required to be satisfied.

$$1.05 \leq [\% \ Mn*A]/[\% \ Mn] \quad \text{Formula (iii)}$$

Further, in addition to denitrification directly from the austenitic phase to the atmosphere, denitrification through the ferrite phase to the atmosphere may occur. Thus, excessive concentration of Mn in the austenitic phase causes excessive dilution of Mn in the ferrite phase, accelerating the denitrification through the ferrite phase. Accordingly, a formula (iv) is required to be satisfied.

$$[\% \ Mn*A]/[\% \ Mn] \leq 1.80 \quad \text{Formula (iv)}$$

Further, S and B in the steel, which are surface-active elements, may reduce denitrification when entering a denitrified site on the surface of the steel. S and B are elements concentrated in the ferrite phase. Accordingly, increasing the S content and the B content in the ferrite phase contributes to preventing denitrification through the ferrite phase. However, the S content and the B content in the ferrite phase are so small that the S content and the B content are difficult to measure. Accordingly, a relationship between the degree of concentration of Cr concentrated in the ferrite phase and the corrosion resistance was studied on the assumption that the S content and the B content in the ferrite phase correlate with the degree of concentration of Cr in the ferrite phase in the same manner as for the formula (i). As a result, the applicant has found that a formula (v) needs to be satisfied to improve the corrosion resistance.

$$1.03 \leq [\% \ Cr*F]/[\% \ Cr] \quad \text{Formula (v)}$$

For instance, the S content and the B content in the ferrite phase can be determined with reference to the degree of concentration of Cr as in the formula (v).

Specifically, assuming that the degree of concentration of Cr in the ferrite phase is comparable to those of S and B, the S content and the B content in the ferrite phase are determined with reference to the S content and the B content in the steel and the degree of concentration of Cr in the ferrite phase. In this case, a formula (vi) below is preferably satisfied.

$$([\% \ S]+[\% \ B]) \times [\% \ Cr*F]/[\% \ Cr] \leq 0.0010 \quad \text{Formula (vi)}$$

In the formula, [% symbol of an element] indicates a content (mass %) of the element in the steel, [% symbol of an element*F] indicates a content (mass %) of the element in the ferrite phase, and [% symbol of an element*A] indicates a content (mass %) of the element in the austenitic phase.

The formulae (v) and (vi) are intended to directly/indirectly determine the respective degrees of concentration of Cr, S and B in the ferrite phase for enhancement of the corrosion resistance. The S content and the B content in the ferrite phase are smaller than the Mn content. Thus, the respective degrees of concentration of S and B, the respective contents of which are difficult to measure, are less influential on the corrosion resistance than the degree of concentration of Mn. Thus, the corrosion resistance can be enhanced as long as at least the formula (v) is satisfied.

The degree of concentration of Cr in the ferrite phase is required to satisfy a formula (I) below, which is a combination of the formulae (i) and (v).

$$1.03 \leq [\% \ Cr*F]/[\% \ Cr] \leq 1.40 \qquad \text{Formula (I)}$$

The degree of concentration of Mn in the austenitic phase is required to satisfy a formula (II) below, which is a combination of the formulae (iii) and (iv).

$$1.05 \leq [\% \ Mn*A]/[\% \ Mn] \leq 1.80 \qquad \text{Formula (II)}$$

In the formula, [% symbol of an element] indicates a content (mass %) of the element in the steel, [% symbol of an element*F] indicates a content (mass %) of the element in the ferrite phase, and [% symbol of an element*A] indicates a content (mass %) of the element in the austenitic phase.

It should be noted that an EPMA (Electron Probe Micro Analyzer) is used to measure the Cr content in the ferrite phase and the Mn content in the austenitic phase in the ferritic-austenitic duplex stainless steel. The EPMA is JXA-8230 type manufactured by JEOL Ltd. LaB6 electron gun is used. Analysis conditions include accelerating voltage: 15 kV, illumination current: 125 nA, and beam diameter: minimum size of less than 1 μm (0 μm for the device according to the exemplary embodiment). A spectrometer is XM-86030 type manufactured by JEOL Ltd. A dispersive crystal is LiF. A relative intensity of CrKα beam and MnKα beam are calculated and converted into concentration with reference to an analytical curve. To obtain an analytical curve for measuring the Cr content in the ferrite phase, SUS430-based ferritic stainless steel samples are produced that have different Cr contents (mass %) of 18%, 24% and 28%. The analytical curve is obtained using such three analytical curve samples. To obtain an analytical curve for measuring the Mn content in the austenitic phase, SUS304-based austenitic stainless steel samples are produced that have different Mn contents (mass %) of 0.1%, 1%, 3%, 6%, 10%, and 15%. Among the above samples, three analytical curve samples with Mn contents being close to the Mn content of the ferritic-austenitic duplex stainless steel are selected to obtain the analytical curve. Specifically, the three analytical curve samples are selected such that the Mn content of the ferritic-austenitic duplex stainless steel being analyzed falls within a range defined by the Mn contents of these samples. Further, when the Mn content of the ferritic-austenitic duplex stainless steel is 0.0%, the Mn content in the austenitic phase is determined to be 0.0% as well. For the Cr content and the Mn content of each of the analytical curve samples, values analyzed to a second decimal place by an atomic emission spectrometry according to JIS G 1258 are used as true values. A position in the ferritic-austenitic duplex stainless steel for analyzing the Cr content and the Mn content in each phase is determined as follows. Map analysis is performed near a middle of a sheet thickness of a cross section of the sample at a pitch of 0.2 μm to find the element distribution. A phase with a high Cr content is the ferrite phase and a phase with a low Cr content is the austenitic phase. The Cr content near a middle of each of selected five parts of the ferrite phase is measured by quantitative point analysis. Similarly, the Mn content near a middle of each of selected five part of the austenitic phase is measured by quantitative point analysis. For the point analysis, a relatively large part of the phase unlikely to be affected by other phases is selected. If there is segregation or inclusion, a part of the phase distant from the segregation or inclusion is selected. If segregation or inclusion near the middle of the sheet thickness is unignorable, the measurement may be performed near a position corresponding to one quarter of the sheet thickness. The average of the respective Cr contents of the five parts of the ferrite phase is referred to as the Cr content in the ferrite phase. The average of the respective Mn contents of the five parts of the austenitic phase is referred to as the Mn content in the austenitic phase.

Next, a production method will be described below.

The ferritic-austenitic duplex stainless steel material according to the exemplary embodiment is in the form of, for instance, a steel sheet or a steel pipe, so that the production method will be described below through examples of a method of producing the steel sheet and a method of producing the steel pipe.

The method of producing the steel sheet according to the exemplary embodiment may include a typical process for producing a ferritic-austenitic duplex stainless steel. Typically, the ferritic-austenitic duplex stainless steel is produced by: producing molten steel in a converter or an electric furnace; refining the molten steel in, for instance, an AOD (Argon-Oxygen-Decarburization) furnace or a VOD (Vacuum-Oxygen-Decarburization) furnace; forming the molten steel into steel billet by a continuous casting method or an ingot-making method; and subjecting the steel billet to a series of hot rolling, hot-rolled-steel-sheet annealing, pickling, cold rolling, final annealing, and pickling. The hot-rolled-steel-sheet annealing is optional and a series of cold rolling, final annealing and pickling may be repeated as needed.

The hot rolling and the hot-rolled-steel-sheet annealing may be performed under typical conditions such as heating temperature for hot rolling: 1000 degrees C. to 1300 degrees C. and temperature for hot-rolled-steel-sheet annealing: 900 degrees C. to 1200 degrees C. It should be noted that the invention is not characterized by production conditions for the hot rolling and the hot-rolled-steel-sheet annealing, which are not limited. Thus, as long as the produced steel can provide the advantages of the invention, for instance, conditions for hot rolling, whether hot-rolled-steel-sheet annealing is performed, the temperature for hot-rolled-steel-sheet annealing, atmosphere, and conditions for cold rolling may be determined as desired. In addition, the final pickling may be preceded by a typical treatment such as a mechanical treatment (e.g., shotblasting and grinding brush) and a chemical treatment (e.g., molten salt treatment and neutral salt electrolysis). The product may be subjected to temper rolling and/or passed through a tension leveler after the cold rolling and annealing. Further, the sheet thickness of the product may be determined depending on a required thickness of the member.

The method of producing the steel pipe according to the exemplary embodiment may include a typical process for producing a stainless steel pipe. The steel pipe may be produced as a welded pipe from a steel sheet by a typical method of producing a stainless steel pipe, such as electrical resistance welding, TIG (Tungsten Inert Gas) welding, and laser welding. Bead grinding of a welded portion, mechanical treatment and/or chemical treatment of a surface of the steel pipe, and/or annealing may be performed as needed.

The final annealing is an important treatment for recrystallization of the steel and elimination of distortion caused by rolling and treatment. For the ferritic-austenitic duplex stainless steel, the final annealing is supposed to affect the area ratio of the austenitic phase, the Cr content in the ferrite phase, and the Mn content in the austenitic phase. Here, the final annealing means a finish annealing performed at the end of the process for producing the steel sheet or the steel pipe. Specifically, the final annealing for the steel sheet means annealing performed at the end of the process for producing the steel sheet. The final annealing for the steel pipe means annealing performed at the end of the process for producing the steel pipe or, if the annealing is not performed at the end of the process for producing the steel pipe, means annealing at the end of the process for producing the steel sheet.

With the annealing temperature being low and the annealing time being short, recrystallization and elimination of distortion would be insufficient. With the annealing temperature being excessively high, the growth of the ferrite phase would be excessively promoted. Accordingly, the final annealing is performed at a temperature of 1200 degrees C. or less such that time Th (sec) for a range of 900 degrees C. or more is 30 seconds or more. The distribution of the elements to the ferrite phase and the austenitic phase progresses with time. Specifically, Cr and Mn diffuse into the ferrite phase and the austenitic phase with time, respectively. However, the ratio of the ferrite phase increases with an increase in the temperature, so that Cr in the ferrite phase is diluted to lower the ratio of the austenitic phase, resulting in excessive concentration of the Mn in the austenitic phase. In view of the above, an increase in a ratio of time for a range of 500 degrees C. to 900 degrees C. to time for the range of 900 degrees C. or more is supposed to be necessary for increasing the degree of concentration of Cr in the ferrite phase so that the Mn in the austenitic phase is not excessively concentrated. However, an excessively large ratio of the time for the range of 500 degrees C. to 900 degrees C. to the time for the range of 900 degrees C. or more results in excessive concentration of Cr in the ferrite phase and, consequently, dilution of the Mn in the austenitic phase. Accordingly, to satisfy the formulae (I) and (II), a formula (III) below is required to be satisfied, where Tu (sec) denotes time for the range of 500 degrees C. to 900 degrees C. in a temperature-rise process, Th (sec) denotes time for the range of 900 degrees C. or more in the temperature-rise process, and Td (sec) denotes time for a range of 900 degrees C. to 500 degrees C. in a cooling process.

$$0.20 \leq (Tu+Td)/Th \leq 10.00 \quad \text{Formula (III)}$$

An excessive reduction in time for temperature rise is likely to result in a variation in quality due to a variation in temperature rise of the steel and an excessive reduction in time for temperature fall is likely to result in deterioration in form. In contrast, an excessive increase in time for temperature rise and time for temperature fall results in a reduction in toughness due to the precipitation of an σ phase and in productivity. Accordingly, it is preferable that the time Tu (sec) for the range of 500 degrees C. to 900 degrees C. in the temperature-rise process ranges from 5 seconds to 100 seconds and the time Td (sec) for the range of 900 degrees C. to 500 degrees C. in the cooling process ranges from 1 second to 400 seconds.

Intended Usage

The ferritic-austenitic duplex stainless steel material according to the exemplary embodiment is usable for any members required to exhibit brazeability and corrosion resistance after a brazing heat treatment. For instance, the ferritic-austenitic duplex stainless steel material is usable as a material for vehicle part, heat exchangers, pipe, and channel structure.

Specifically, examples of the vehicle part include an in-vehicle channel part with a material temperature being 400 degrees C. or less in use and a part joined thereto, a material of which can be the ferritic-austenitic duplex stainless steel material. Specific examples include: a pipe or a channel structure for a substance such as water, oil, air, fuel, exhaust gas, and non-high pressure hydrogen equipped in a vehicle such as automobile, bus, truck, motor cycle, construction vehicle, agriculture vehicle, industrial vehicle, and railway vehicle, the pipe or the channel structure having a material temperature of 400 degrees C. or less in use; a to-be-brazed part joined to be joined to the pipe or the channel structure for a purpose such as tightening, fixation and protection; a to-be-brazed part other than the above vehicle parts, such as accessory parts (e.g., water pipe, oil pipe, air pipe, fuel tube, delivery tube, joint pipe, fuel filler pipe, hydrogen pipe, EGR (Exhaust Gas Recirculation) cooler part with a material temperature of 400 degrees C. or less, and exhaust system part) of, for instance, vehicle engine, turbocharger and fuel tank; and a part (e.g., flange, stay, bracket, and cover) joined to such these pipes or channel structure.

Examples of the heat exchanger include a heat exchanger configured to be attached to air conditioner, water heater, home appliance, and fuel cell.

Examples of the pipe and channel structure also include pipes and channel structures other than the above vehicle parts.

EXAMPLES

The effects of the invention will be more clearly described below with reference to Examples. It should be noted that the invention is not limited to Examples below and may be modified without departing from the spirit of the invention.

Example 1

Each of samples with chemical compositions shown in Table 1 (Example A to Example P and Comparative Example Q to Comparative Example AA) produced by melting in a vacuum melting furnace was hot-rolled into a 4.5-mm thick hot-rolled steel sheet after heated to 1200 degrees C. The hot-rolled steel sheet was annealed at 1000 degrees C. and cold-rolled to be 1.5-mm thick after pickled. Subsequently, the sheet was subjected to final annealing under conditions shown in Tables 2-1 and 2-3 and pickled. The thus-obtained cold-rolled sheet, which was annealed and pickled, was used as a sample for measurement of the area ratio of the austenitic phase, measurement of a Cr content in the ferrite phase and a Mn content in the austenitic phase, evaluation of brazeability, and evaluation of corrosion resistance after a brazing heat treatment.

TABLE 1

|  | Steel No. | C | N | Si | Mn | P | S | Cr | Cu | Ni | Mo | Al | B | Ca | Others |
|---|---|---|---|---|---|---|---|---|---|---|---|---|---|---|---|
| Ex. | A | 0.015 | 0.13 | 0.3 | 2.1 | 0.026 | 0.0009 | 20.2 | 1.3 | 2.0 | 0.8 | 0.015 | 0.0009 | 0.0021 | |
|  | B | 0.015 | 0.16 | 0.6 | 3.6 | 0.018 | 0.0009 | 20.7 | 0.7 | 3.4 | 0.4 | 0.021 | 0.0023 | 0.0014 | |
|  | C | 0.010 | 0.14 | 0.7 | 2.8 | 0.016 | 0.0014 | 21.2 | 0.9 | 2.1 | 0.6 | 0.024 | 0.0024 | 0.0003 | |
|  | D | 0.011 | 0.19 | 0.5 | 2.1 | 0.022 | 0.0006 | 20.5 | 1.4 | 1.9 | 0.7 | 0.007 | 0.0003 | 0.0007 | |
|  | E | 0.021 | 0.14 | 0.4 | 2.1 | 0.008 | 0.0013 | 22.8 | 1.3 | 3.6 | 0.5 | 0.014 | 0.0021 | 0.0018 | |
|  | F | 0.009 | 0.11 | 0.7 | 1.5 | 0.024 | 0.0003 | 21.1 | 2.5 | 3.2 | 1.1 | 0.016 | 0.0010 | 0.0009 | |
|  | G | 0.021 | 0.10 | 0.5 | 2.5 | 0.013 | 0.0011 | 18.8 | 2.3 | 1.2 | 1.9 | 0.011 | 0.0009 | 0.0010 | |
|  | H | 0.018 | 0.16 | 0.4 | 2.4 | 0.023 | 0.0014 | 20.4 | 1.5 | 0.3 | 0.7 | 0.015 | 0.0015 | 0.0012 | |
|  | I | 0.031 | 0.12 | 1.2 | 0.8 | 0.017 | 0.0014 | 21.3 | 2.1 | 2.4 | 0.9 | 0.027 | 0.0014 | 0.0019 | Mg: 0.0003 |
|  | J | 0.014 | 0.15 | 0.6 | 1.2 | 0.016 | 0.0021 | 22.8 | 0.3 | 4.1 | 0.7 | 0.025 | 0.0026 | 0.0013 | Ti: 0.05, Co: 0.2 |
|  | K | 0.009 | 0.17 | 0.6 | 1.3 | 0.031 | 0.0004 | 21.7 | 0.2 | 4.4 | 1.1 | 0.020 | 0.0005 | 0.0010 | Bi: 0.01 |
|  | L | 0.019 | 0.24 | 0.9 | 5.8 | 0.016 | 0.0010 | 22.3 | 1.3 | 2.4 | 0.2 | 0.017 | 0.0007 | 0.0003 | Sn: 0.1, Zr: 0.08 |
|  | M | 0.017 | 0.10 | 1.3 | 0.5 | 0.023 | 0.0009 | 22.6 | 2.9 | 4.9 | 1.1 | 0.024 | 0.0004 | 0.0008 | V: 0.05, Ta: 0.2 |
|  | N | 0.023 | 0.18 | 0.3 | 1.7 | 0.014 | 0.0009 | 26.3 | 0.3 | 5.5 | 0.5 | 0.022 | 0.0013 | 0.0018 | Sb: 0.06, Nb: 0.1 |
|  | O | 0.015 | 0.16 | 0.5 | 2.4 | 0.014 | 0.0009 | 23.9 | 1.9 | 4.8 | 3.4 | 0.013 | 0.0024 | 0.0014 | Hf: 0.08, W: 1.3 |
|  | P | 0.014 | 0.21 | 0.1 | 0.9 | 0.022 | 0.0006 | 24.9 | 0.3 | 6.6 | 2.1 | 0.016 | 0.0007 | 0.0008 | Ga: 0.003, REM: 0.04 |
| Comp. | Q | <u>0.105</u> | 0.06 | 0.4 | 0.9 | 0.024 | 0.0006 | 21.9 | 1.0 | 3.1 | 0.2 | 0.016 | 0.0011 | 0.0019 | |
|  | R | 0.009 | <u>0.32</u> | 0.7 | 0.6 | 0.027 | 0.0014 | 20.6 | 0.4 | 0.5 | 0.3 | 0.014 | 0.0013 | 0.0018 | |
|  | S | 0.014 | 0.11 | 1.2 | <u>9.2</u> | 0.013 | 0.0035 | 20.1 | 1.2 | 3.5 | 0.3 | 0.002 | 0.0030 | 0.0013 | |
|  | T | 0.022 | 0.13 | 0.7 | <u>0.4</u> | <u>0.003</u> | 0.0013 | 23.1 | 2.0 | 5.6 | 2.4 | 0.016 | 0.0016 | 0.0010 | |
|  | U | 0.017 | 0.21 | 1.4 | 0.8 | 0.027 | <u>0.0000</u> | 22.2 | 1.2 | 2.4 | 0.5 | 0.018 | 0.0007 | 0.0019 | |
|  | V | 0.009 | 0.10 | 1.1 | 0.5 | 0.020 | 0.0008 | <u>16.2</u> | 0.7 | 2.5 | 0.3 | 0.016 | 0.0013 | 0.0009 | |
|  | W | 0.019 | 0.18 | 0.8 | 2.1 | 0.015 | 0.0016 | <u>28.5</u> | 2.8 | 6.1 | 0.5 | 0.026 | 0.0029 | 0.0017 | |
|  | X | 0.011 | 0.13 | 0.9 | <u>0.0</u> | 0.018 | 0.0014 | 20.5 | <u>0.0</u> | <u>0.0</u> | 0.2 | 0.028 | 0.0003 | 0.0006 | |
|  | Y | 0.015 | 0.11 | 1.3 | 0.6 | 0.024 | 0.0007 | 18.4 | 0.5 | 3.1 | <u>0.0</u> | 0.021 | 0.0015 | 0.0006 | |
|  | Z | 0.011 | 0.11 | 1.4 | 1.2 | 0.031 | 0.0013 | 21.5 | 3.0 | 4.1 | 1.3 | <u>0.087</u> | 0.0017 | 0.0009 | |
|  | AA | 0.019 | 0.18 | 1.4 | 0.6 | 0.024 | 0.0008 | 20.5 | 1.4 | 2.1 | 1.0 | 0.010 | <u>0.0000</u> | 0.0011 | |

※1 underline: out of the scope of the invention
※2 The balance consists of Fe and inevitable impurities.

Measurement of Area Ratio and Content

The area ratio of the austenitic phase was determined by measuring a surface of the sample using a ferrite scope under the above conditions. The Cr content in the ferrite phase and the Mn content in the austenitic phase were determined by analyzing a cross section of the sample using EPMA under the above conditions.

Evaluation of Brazeability

For evaluation of the brazeability of the sample, a predetermined gap provided between upper and lower sheets made of the sample was permeated with filler and a fillet shape was evaluated. It should be noted that the fillet is a part of the filler out of the gap.

Specifically, the upper sheet (10 mm in length and 30 mm in width) and the lower sheet (30 mm in length and 50 mm in width) were cut out of the sample, and a test piece was prepared by placing the upper sheet on a center of an upper side of the lower sheet with a 0.3-mm gap being formed between the two sheets. A 0.3-mm thick sheet of SUS304 (a gap forming material) was placed under an end of the upper sheet in a width direction and welded to prevent the sheets from being moved. 0.9 g of BCu-1A (Cu brazing filler metal according to JIS Z 3262) was applied under a first end of the upper sheet in a length direction, heated to 1150 degrees C. in a pure hydrogen atmosphere, and cooled after held for one minute. After being cooled, the test piece was cut at a center in the width direction to show a cross section, which was observed to evaluate the fillet shape. When the filler was sufficiently permeated in the gap with a part of the filler being out of the gap, the fillet shape was evaluated as excellent. When the filler was not out of the gap or when the filler, which was partly out of the gap, failed to fully spread near an end of the gap (the gap partly remained and could form a void), the fillet shape was evaluated as poor. Since Ni brazing filler metal is more excellent in brazeability than Cu brazing filler metal, the brazeability evaluation was basically performed with the use of Cu brazing filler metal as described above. However, for Examples, the fillet shape has proven to be excellent with the use of BNi-5 (Ni brazing filler metal according to JIS Z 3265).

Measurement of Corrosion Resistance

For evaluation of the corrosion resistance of the sample after a brazing heat treatment, a pitting potential of the sample before the brazing heat treatment and a pitting potential of the sample after the brazing heat treatment were measured. The brazing heat treatment was performed by heating the sample to 1150 degrees C. in a pure hydrogen atmosphere and cooling the sample after the sample was held for one minute. For evaluation of the pitting potential, a pitting initiation potential VC100 was measured in 1 mol/L of a sodium chloride solution at 30 degrees C. under an Ar-degassed atmosphere according to a method of measuring a pitting potential of stainless steel as defined in JIS G 0577. It should be noted that a surface layer of the sample is supposed to be affected by, for instance, denitrification resulting from the brazing heat treatment. Accordingly, in measuring the pitting potential, the surface was not subjected to any surface treatment such as polishing, passivation, and imminent polishing. The sample with a pitting potential being less than 0.20 V before the brazing heat treatment, which was lower than the pitting potential of SUS304, was evaluated as poor. Among the samples with a pitting potential being 0.20 V or more before the brazing heat treatment, one(s) with a pitting potential being less than 0.20 V after a brazing heat treatment was evaluated as poor and one(s) with a pitting potential exceeding 0.70 V (i.e., higher than the pitting potential of SUS316) was evaluated as excellent. Among the samples with a pitting potential ranging from 0.20 V to 0.70 V after a brazing heat treatment, one(s) with a pitting potential after a brazing heat treatment being decreased from the a pitting potential before the brazing heat treatment by 30% or more was evaluated as poor.

Tables 2-1, 2-2, 2-3 and 2-4 show the results.

TABLE 2-1

| | | | Final Annealing Conditions | | | |
|---|---|---|---|---|---|---|
| | | | Anneal- | Time for 500° C. to 900° C. | Time | |
| | | | ing Temper- | Tempera- ture—Rise | Cooling | for 900° C. | Middle of For- |
| | Steel | ature | Process | Process | or More | mula |
| No. | No. | (° C.) | Tu(sec) | Td(sec) | Th(sec) | (III) |
| Ex. 1 | A | 1060 | 32 | 28 | 33 | 1.82 |
| 2 | B | 1140 | 19 | 33 | 123 | 0.42 |
| 3 | C | 1060 | 17 | 10 | 88 | 0.31 |
| 4 | D | 1140 | 24 | 15 | 62 | 0.63 |
| 5 | E | 1030 | 28 | 34 | 42 | 1.48 |
| 6 | F | 1080 | 24 | 16 | 48 | 0.83 |
| 7 | G | 1160 | 20 | 10 | 90 | 0.33 |
| 8 | H | 1000 | 17 | 28 | 57 | 0.79 |
| 9 | I | 950 | 38 | 29 | 245 | 0.27 |
| 10 | J | 1110 | 73 | 8 | 80 | 1.01 |
| 11 | K | 1090 | 27 | 19 | 78 | 0.59 |
| 12 | L | 1000 | 7 | 15 | 91 | 0.24 |
| 13 | M | 1050 | 13 | 215 | 84 | 2.71 |
| 14 | N | 1130 | 31 | 5 | 68 | 0.53 |
| 15 | O | 1160 | 49 | 31 | 108 | 0.74 |
| 16 | P | 1020 | 39 | 14 | 64 | 0.83 |

TABLE 2-3

| | | | Final Annealing Conditions | | | |
|---|---|---|---|---|---|---|
| | | Anneal- | Time for 500° C. to 900° C. | | Time | Middle |
| | | ing Temper- | Tempera- ture—Rise | Cooling | for 900° C. | of For- |
| | Steel | ature | Process | Process | or More | mula |
| | No. No. | (° C.) | Tu(sec) | Td(sec) | Th(sec) | (III) |
| Comp. 17 | Q | 1140 | 47 | 6 | 47 | 1.13 |
| 18 | R | 1000 | 50 | 29 | 89 | 0.89 |
| 19 | S | 1110 | 45 | 43 | 48 | 1.83 |
| 20 | T | 1010 | 8 | 17 | 64 | 0.39 |
| 21 | U | 1070 | 23 | 42 | 101 | 0.64 |
| 22 | V | 1070 | 26 | 6 | 55 | 0.58 |
| 23 | W | 1050 | 28 | 40 | 64 | 1.06 |
| 24 | X | 1160 | 18 | 19 | 61 | 0.61 |
| 25 | Y | 1100 | 12 | 13 | 40 | 0.63 |
| 26 | Z | 1050 | 47 | 29 | 54 | 1.41 |
| 27 | AA | 1100 | 45 | 32 | 71 | 1.08 |
| 28 | I | <u>1270</u> | 24 | 39 | 33 | 1.91 |
| 29 | J | <u>990</u> | 75 | 261 | 31 | <u>10.84</u> |
| 30 | K | 1010 | 21 | 23 | 239 | <u>0.18</u> |
| 31 | N | <u>970</u> | 65 | 289 | 35 | <u>10.11</u> |

Formula (III): 0.20 ≤ (Tu + Td)/Th ≤ 10.00
※ underline: out of the scope of the invention

TABLE 2-2

| | | Area Ratio of Aus- tenitic Phase | Content of Component in Steel (mass %) | | Content of Component in Each Phase (mass %) | | Mid- dle of For- mula | Mid- dle of For- mula | Fillet Shape after | Pitting Potential V'C100 | | ②/① | Left Side of For- mula | Left Side of For- mula |
|---|---|---|---|---|---|---|---|---|---|---|---|---|---|---|
| | | | | | | | | | | ①Before Brazing Heat Treatment | ②After Brazing Heat Treatment | | | |
| | Steel | | | | Ferrite Phase | Austenitic Phase | | | | | | | | |
| No. | No. | (%) | [% Cr] | [% Mn] | [% Cr * F] | [% Mn * A] | (I) | (II) | Brazing | (V) | (V) | | (ii) | (vi) |
| Ex. 1 | A | 48 | 20.2 | 2.1 | 23.0 | 2.5 | 1.14 | 1.19 | Excellent | 0.47 | 0.42 | 0.89 | 0.013 | 0.0020 |
| 2 | B | 51 | 20.7 | 3.6 | 22.9 | 4.5 | 1.11 | 1.25 | Excellent | 0.29 | 0.27 | 0.93 | −0.003 | 0.0035 |
| 3 | C | 47 | 21.2 | 2.8 | 24.6 | 3.8 | 1.16 | 1.36 | Excellent | 0.36 | 0.28 | 0.78 | −0.009 | 0.0044 |
| 4 | D | 50 | 20.5 | 2.1 | 22.6 | 3.0 | 1.10 | 1.43 | Excellent | 0.72 | 0.58 | 0.81 | 0.017 | 0.0010 |
| 5 | E | 52 | 22.8 | 2.1 | 25.7 | 2.5 | 1.13 | 1.19 | Excellent | 0.69 | 0.54 | 0.78 | −0.007 | 0.0038 |
| 6 | F | 54 | 21.1 | 1.5 | 24.1 | 1.9 | 1.14 | 1.27 | Excellent | 0.49 | 0.41 | 0.84 | 0.009 | 0.0015 |
| 7 | G | 43 | 18.8 | 2.5 | 20.5 | 3.1 | 1.09 | 1.24 | Excellent | 0.86 | 0.70 | 0.81 | 0.002 | 0.0022 |
| 8 | H | 46 | 20.4 | 2.4 | 22.6 | 2.9 | 1.11 | 1.21 | Excellent | 0.54 | 0.46 | 0.85 | 0.009 | 0.0032 |
| 9 | I | 51 | 21.3 | 0.8 | 22.2 | 1.1 | 1.04 | 1.38 | Excellent | 0.44 | 0.43 | 0.98 | −0.010 | 0.0029 |
| 10 | J | 46 | 22.8 | 1.2 | 23.9 | 1.5 | 1.05 | 1.25 | Excellent | 0.88 | 0.71 | 0.81 | −0.009 | 0.0049 |
| 11 | K | 56 | 21.7 | 1.3 | 25.2 | 1.8 | 1.16 | 1.38 | Excellent | 1.15 | 0.95 | 0.83 | 0.013 | 0.0010 |
| 12 | L | 59 | 22.3 | 5.8 | 24.6 | 7.4 | 1.10 | 1.28 | Excellent | 0.74 | 0.68 | 0.92 | −0.001 | 0.0019 |
| 13 | M | 53 | 22.6 | 0.5 | 25.9 | 0.6 | 1.15 | 1.20 | Excellent | 0.81 | 0.77 | 0.95 | −0.001 | 0.0015 |
| 14 | N | 41 | 26.3 | 1.7 | 28.4 | 2.2 | 1.08 | 1.29 | Excellent | 0.99 | 0.85 | 0.86 | −0.009 | 0.0024 |
| 15 | O | 40 | 23.9 | 2.4 | 26.2 | 2.7 | 1.10 | 1.13 | Excellent | 1.18 | 1.08 | 0.92 | 0.001 | 0.0036 |
| 16 | P | 62 | 24.9 | 0.9 | 28.3 | 1.2 | 1.14 | 1.33 | Excellent | 1.11 | 1.02 | 0.92 | 0.007 | 0.0015 |

Formula (I): 1.03 ≤ [% Cr * F]/[% Cr] ≤ 1.40
Formula (II): 1.05 ≤ [% Mn * A]/[% Mn] ≤ 1.80
Formula (ii): ([% P] − [% Al]) × [% Cr * F]/[% Cr] ≥ −0.010
Formula (vi): ([% S] + [% B]) × [% Cr * F]/[% Cr] ≥ 0.0010

TABLE 2-4

| | Steel No. | Steel No. | Area Ratio of Austenitic Phase (%) | Content of Component in Steel (mass %) [% Cr] | Content of Component in Steel (mass %) [% Mn] | Content of Component in Each Phase (mass %) Ferrite Phase [% Cr * F] | Content of Component in Each Phase (mass %) Austenitic Phase [% Mn * A] | Middle of Formula (I) | Middle of Formula (II) | Fillet Shape after Brazing | Pitting Potential V'C100 ①Before Brazing Heat Treatment (V) | Pitting Potential V'C100 ②After Brazing Heat Treatment (V) | ②/① | Left Side of Formula (ii) | Left Side of Formula (vi) |
|---|---|---|---|---|---|---|---|---|---|---|---|---|---|---|---|
| Comp. | 17 | Q | 46 | 21.9 | 0.9 | 24.4 | 1.2 | 1.11 | 1.33 | Excellent | <u>0.19</u> | | | 0.009 | 0.0019 |
| | 18 | R | 64 | 20.6 | 0.6 | 23.8 | 0.8 | 1.16 | 1.33 | Excellent | <u>0.16</u> | | | 0.015 | 0.0031 |
| | 19 | S | 55 | 20.1 | 9.2 | 22.5 | 11.2 | 1.12 | 1.22 | Excellent | <u>0.18</u> | | | 0.012 | 0.0073 |
| | 20 | T | 52 | 23.1 | 0.4 | 25.6 | 0.6 | 1.11 | 1.50 | Poor | 1.17 | 1.04 | 0.89 | −0.014 | 0.0032 |
| | 21 | U | 55 | 22.2 | 0.8 | 24.8 | 0.9 | 1.12 | 1.13 | Excellent | 0.74 | 0.51 | <u>0.69</u> | 0.010 | 0.0008 |
| | 22 | V | 65 | 16.2 | 0.5 | 18.4 | 0.6 | 1.14 | 1.20 | Excellent | <u>0.18</u> | | | 0.005 | 0.0024 |
| | 23 | W | 52 | 28.5 | 2.1 | 32.4 | 2.4 | 1.14 | 1.14 | Poor | 1.17 | 1.12 | 0.96 | −0.013 | 0.0051 |
| | 24 | X | <u>27</u> | 20.5 | 0.0 | 22.4 | 0.0 | 1.09 | | Poor | <u>0.15</u> | | | −0.011 | 0.0019 |
| | 25 | Y | 58 | 18.4 | 0.6 | 20.9 | 0.9 | 1.14 | 1.50 | Excellent | <u>0.17</u> | | | 0.003 | 0.0025 |
| | 26 | Z | 57 | 21.5 | 1.2 | 24.4 | 1.4 | 1.13 | 1.17 | Poor | 1.11 | 1.09 | 0.98 | −0.064 | 0.0034 |
| | 27 | AA | 51 | 20.5 | 0.6 | 23.0 | 0.7 | 1.12 | 1.17 | Excellent | 0.51 | 0.32 | <u>0.63</u> | 0.016 | 0.0009 |
| | 28 | I | <u>29</u> | 21.3 | 0.8 | 22.6 | 1.2 | 1.06 | 1.50 | Poor | <u>0.19</u> | | | −0.011 | 0.0030 |
| | 29 | J | 46 | 22.8 | 1.2 | 32.6 | 1.2 | <u>1.43</u> | <u>1.00</u> | Poor | 0.85 | 0.55 | <u>0.65</u> | −0.013 | 0.0067 |
| | 30 | K | 65 | 21.7 | 1.3 | 22.0 | 2.4 | <u>1.01</u> | <u>1.85</u> | Excellent | 0.97 | 0.66 | <u>0.68</u> | 0.011 | 0.0009 |
| | 31 | N | 58 | 26.3 | 1.7 | 38.2 | 1.7 | <u>1.45</u> | <u>1.00</u> | Poor | 1.17 | 0.81 | <u>0.69</u> | −0.012 | 0.0032 |

Formula (I): $1.03 \leq [\%\ Cr * F]/[\%\ Cr] \leq 1.40$
Formula (II): $1.05 \leq [\%\ Mn * A]/[\%\ Mn] \leq 1.80$
Formula (ii): $([\%\ P] - [\%\ Al]) \times [\%\ Cr * F]/[\%\ Cr] \geq -0.010$
Formula (vi): $([\%\ S] + [\%\ B]) \times [\%\ Cr * F]/[\%\ Cr] \geq 0.0010$
※underline: out of the scope of the invention The chemical composition and final annealing conditions of each of Example 1 to Example 16 fell within the scope of the invention. These Examples, which satisfied the formula (I) related to the area ratio of the austenitic phase and the degree of concentration of Cr in the ferrite phase and the formula (II) related to the degree of concentration of Mn in the austenitic phase, were evaluated as excellent in terms of fillet shape after brazing and pitting potential after a brazing heat treatment.

In Comparative Examples 17, 18 and 19, C, N and Mn each exceeded the upper limit of the appropriate range. In Comparative Examples 22 and 25, Cr and Mo each fell below the lower limit of the appropriate range. These Comparative Examples were evaluated as poor in terms of the pitting potential before the brazing heat treatment.

In Comparative Example 20, P fell below the lower limit of the appropriate range. In Comparative Examples 23 and 26, Cr and Al exceeded the upper limit of the appropriate range. These Comparative Examples were evaluated as poor in terms of the fillet shape after brazing.

Comparative Examples 21 and 27, in which S and B fell below the lower limit of the appropriate range, were evaluated as poor in terms of pitting potential after a brazing heat treatment.

Comparative Example 24, in which Mn, Cu and Ni each fell below the lower limit and the area ratio of the austenitic phase fell below the lower limit, was evaluated as poor in terms of the fillet shape after brazing and the pitting potential before the brazing heat treatment.

Comparative Examples 29 and 31 were within the scope of the invention in terms of chemical composition. However, the final annealing conditions exceeded the upper limit of the appropriate range of the formula (III), so that the degree of concentration of Cr in the ferrite phase exceeded the upper limit of the formula (I) and the degree of concentration of Mn in the austenitic phase fell below the lower limit of the formula (II). These Comparative Examples were evaluated as poor in terms of fillet shape after brazing and pitting potential after a brazing heat treatment.

In Comparative Example 30, the chemical composition was within the scope of the invention. However, the final annealing conditions fell below the lower limit of the appropriate range of the formula (III), so that the degree of concentration of Cr in the ferrite phase fell below the lower limit of the formula (I) and the degree of concentration of Mn in the austenitic phase exceeded the upper limit of the formula (II). Comparative Example 30 was thus evaluated as poor in terms of pitting potential after a brazing heat treatment.

In Comparative Example 28, the chemical composition was within the scope of the invention. However, the temperature for final annealing exceeded the upper limit and the area ratio of the austenitic phase fell below the lower limit. Comparative Example 28 was thus evaluated as poor in terms of the fillet shape after brazing and the pitting potential before the brazing heat treatment.

It should be noted that Example 1 to Example 16 were also evaluated as excellent in terms of the fillet shape after brazing with Ni brazing filler metal.

Tables 2-2 and 2-4 also show the calculation result of the left side of each of the formulae (ii) and (vi) for reference. As shown in Tables 2-2 and 2-4, some of Comparative Examples evaluated as poor in terms of the fillet shape after brazing failed to satisfy the formula (ii) (Comparative Examples 20, 23, 24, 26, 28, 29 and 31). Further, some of Comparative Examples evaluated as poor in terms of pitting potential after a brazing heat treatment failed to satisfy the formula (vi) (Comparative Examples 21, 27 and 30). In contrast, all of Example 1 to Example 16 satisfied the formulae (ii) and (vi).

The above results have proven that the ferritic-austenitic duplex stainless steel satisfying the requirements according to the invention exhibits significantly excellent brazeability and corrosion resistance after a brazing heat treatment.

Example 2

Example 1 demonstrates a relationship between the conditions such as the composition range for the ferritic-austenitic duplex stainless steel according to the invention and properties such as brazeability and corrosion resistance after a brazing heat treatment.

Meanwhile, from the economic point of view, the composition range is preferably modified to provide a ferritic-austenitic duplex stainless steel more excellent in alloy cost, production costs, productivity and filler wettability. The respective contents of Cr, Ni and Mo are preferably reduced in terms of alloy cost. In terms of production cost and productivity, the lower limit range of each of Si and Al is, in particular, preferably increased to reduce the content of each of Mn and Cu. In some cases, the lower limit range of the content of each of B and Ca is preferably increased to reduce the content of N. Moreover, even if the brazeability is satisfactory, further enhancement in filler wettability is preferable. Such an enhanced filler wettability, which allows for reducing the filler usage and designing more complicated brazed structure, is supposed to improve economic efficiency. The lower limit range of each of Mn, Ni and Cu is preferably increased in terms of filler wettability.

Accordingly, to further clarify conditions for achieving the above advantage of the invention, i.e., further improvement in filler wettability, the wet-spreading property of the filler was evaluated with the use of the cold-rolled sheet annealed under the final annealing conditions, the cold-rolled sheet having the chemical composition evaluated as excellent in terms of the fillet shape after brazing in the above brazeability evaluation.

Specifically, each of samples with chemical compositions shown in Table 1 (Example A to Example P) produced by melting in a vacuum melting furnace was hot-rolled into a 4.5-mm thick hot-rolled steel sheet after heated to 1200 degrees C. The hot-rolled steel sheet was annealed at 1000 degrees C. and cold-rolled to be 1.5-mm thick after pickled. Subsequently, the sheet was subjected to final annealing under the conditions No. 1 shown in Table 2-1 and pickled. The thus-obtained cold-rolled sheet, which was annealed and pickled, was used as a sample for evaluation of the wet-spreading property of the filler.

Evaluation of Wet-Spreading Property of Filler

To evaluate, in terms of filler wettability, the sample annealed under the final annealing conditions and having the chemical composition allowing for an excellent brazeability as evaluated, the wet-spreading property of Ni brazing filler metal or Cu brazing filler metal was evaluated on a surface of the sample.

Specifically, a 50-mm long×50-mm wide test piece was cut out of the sample and 0.1 g of Ni brazing filler metal or Cu brazing filler metal was applied on the test piece in a 5-mm diameter circle. The Ni brazing filler metal was BNi-5 (Ni brazing filler metal) according to JIS Z 3265 and the Cu brazing filler metal was BCu-1A (Cu brazing filler metal) according to JIS Z 3262. A brazing furnace was a vacuum furnace, which was adjusted to achieve an in-furnace pressure of approximately 30 Pa by vacuuming or nitrogen gas purge when heated. The test piece with the Ni brazing filler metal thereon was heated to 1200 degrees C. and the test piece with the Cu brazing filler metal thereon was heated to 1150 degrees C. In either case, the test piece was kept at the temperature for 10 minutes. After the test piece was cooled, an area of the filler after the test was obtained by image analysis and the obtained area was divided by the filler-applied area before the heating to determine a filler-spreading coefficient. In other words, the filler-spreading coefficient was calculated by (the area of the filler after the test)/(the area of the 5-mm diameter circle). The wettability of the Ni brazing filler metal was evaluated as excellent at the filler-spreading coefficient of 9.0 or more and evaluated as more excellent at the filler-spreading coefficient of 9.5 or more. The Cu brazing filler metal wettability was evaluated as excellent at the filler-spreading coefficient of 4.0 or more and evaluated as more excellent at the filler-spreading coefficient of 5.0 or more. With the use of the samples, the filler material, vacuum furnace, and brazing heat treatment conditions for this evaluation, the fillet shape was also evaluated in the same manner as in the above brazeability evaluation. The fillet shape of each sample was evaluated as excellent.

Table 3 shows the results.

TABLE 3

| Steel No. | Content of Component in Steel (mass %) | | | Filler-Spreading Coefficient | |
|---|---|---|---|---|---|
| | [% Mn] | [% Ni] | [% Cu] | Ni Filler | Cu Filler |
| A | 2.1 | 2.0 | 1.3 | 9.3 | 4.3 |
| B | 3.6 | 3.4 | 0.7 | 9.8 | 3.7 |
| C | 2.8 | 2.1 | 0.9 | 9.7 | 5.0 |
| D | 2.1 | 1.9 | 1.4 | 9.3 | 4.6 |
| E | 2.1 | 3.6 | 1.3 | 9.4 | 4.6 |
| F | 1.5 | 3.2 | 2.5 | 9.0 | 4.8 |
| G | 2.5 | 1.2 | 2.3 | 8.4 | 4.9 |
| H | 2.4 | 0.3 | 1.5 | 8.0 | 4.4 |
| I | 0.8 | 2.4 | 2.1 | 9.1 | 4.8 |
| J | 1.2 | 4.1 | 0.3 | 9.4 | 3.4 |
| K | 1.3 | 4.4 | 0.2 | 9.2 | 3.3 |
| L | 5.8 | 2.4 | 1.3 | 9.7 | 5.1 |
| M | 0.5 | 4.9 | 2.9 | 9.4 | 4.7 |
| N | 1.7 | 5.5 | 0.3 | 9.3 | 3.3 |
| O | 2.4 | 4.8 | 1.9 | 9.3 | 4.4 |
| P | 0.9 | 6.6 | 0.3 | 9.2 | 3.5 |

Samples A, D, E, F, I, J, K, M, N, O and P, in which, in mass %, the Ni content was more than 1.8% and the Mn content was 2.7% or less, were excellent in the wettability of the Ni brazing filler metal.

Samples B, C and L, in which, in mass %, the Ni content was more than 1.8% and the Mn content was more than 2.7%, were more excellent in the wettability of the Ni brazing filler metal.

Samples A, D, E, F, G, H, I, M and O, in which, in mass %, the Cu content was more than 0.8% and the Mn content was 2.7% or less, were excellent in the wettability of the Cu brazing filler metal.

Samples C and L, in which, in mass %, the Cu content was more than 0.8% and the Mn content was more than 2.7%, were more excellent in the wettability of the Cu brazing filler metal.

Conditions for the ferritic-austenitic duplex stainless steel, which satisfies the requirements according to the invention, to exhibit further excellent wettability have been clarified by the above results. The following composition is specifically required as the conditions.

Ni: more than 1.8%
Mn: more than 2.7%
Cu: more than 0.8%

INDUSTRIAL APPLICABILITY

According to the exemplary embodiment of the invention, the ferritic-austenitic duplex stainless steel material with excellent corrosion resistance and high strength can be used as a material for an in-vehicle channel part having a material temperature of 400 degrees C. or less in use and a part joined thereto or for a to-be-brazed part. The use of the ferritic-austenitic duplex stainless steel material allows for reducing a material thickness and, consequently, a vehicle weight, which significantly contributes to, for instance, environmental measures and cost reduction of parts. Similarly, the use of the ferritic-austenitic duplex stainless steel material for a to-be-brazed part not for a vehicle allows for reducing a material thickness, which contributes to, for instance, reducing the size of a part, reducing costs, and improving a heat exchange performance. For instance, the ferritic-austenitic duplex stainless steel can be used for: a pipe or a channel structure for a substance such as water, oil, air, fuel, exhaust gas, and non-high pressure hydrogen equipped in a vehicle such as automobile, bus, truck, motor cycle, construction vehicle, agriculture vehicle, industrial vehicle, and railway vehicle, the pipe or the channel structure having a material temperature of 400 degrees C. or less in use; a to-be-brazed part to be joined to the pipe or the channel structure for a purpose such as tightening, fixation and protection; a to-be-brazed part not for the above vehicle parts, such as accessory parts (e.g., water pipe, oil pipe, air pipe, fuel tube, delivery tube, joint pipe, fuel filler pipe, hydrogen pipe, EGR (Exhaust Gas Recirculation) cooler part with a material temperature of 400 degrees C. or less, and exhaust system part) of, for instance, vehicle engine, turbocharger and fuel tank; and parts (e.g., flange, stay, bracket, and cover) joined to these pipes or channel structure. In addition to the vehicle parts, the ferritic-austenitic duplex stainless steel can be used for a heat exchanger configured to be attached to air conditioner, water heater, home appliance, and fuel cell and for other parts such as pipes and channel structure. The invention is intended to be applicable to an instance where Cu brazing filler metal or Ni brazing filler metal is used for brazing. However, a filler material other than Cu brazing filler metal and Ni brazing filler metal would be used for brazing. In this case, changes in filler wettability and corrosion resistance after a brazing heat treatment are supposed to be basically caused by the same physical phenomenon as described above. Accordingly, the invention is also applicable to a case where a filler material other than Cu brazing filler metal and Ni brazing filler metal is used. Examples of the filler material include phosphorus-copper brazing filler metal, silver brazing filler metal, gold brazing filler metal, palladium brazing filler metal, and aluminum brazing filler metal.

The invention claimed is:

1. A ferritic-austenitic duplex stainless steel material comprising, in mass %,
C: 0.005% to 0.050%,
N: 0.05% to 0.30%,
Si: 0.1% to 1.5%,
Mn: 0.1% to 7.0%,
P: 0.005% to 0.100%,
S: 0.0001% to 0.0200%,
Cr: 18.0% to 28.0%,
Cu: 0.1% to 3.0%,
Ni: 0.1% to 8.0%,
Mo: 0.1% to 5.0%,
Al: 0.001% to 0.050%,
B: 0.0001% to 0.0200%,
Ca: 0.0001% to 0.0100%, and
a balance consisting of Fe and inevitable impurities, wherein
an austenitic phase has an area ratio ranging from 30% to 70%, and
formulae (I) and (II) below are satisfied, $$1.03 \leq [\%\ Cr*F]/[\%\ Cr] \leq 1.40 \quad \text{Formula (I)}$$

$$1.05 \leq [\%\ Mn*A]/[\%\ Mn] \leq 1.80 \quad \text{Formula (II)}$$

where [% symbol of an element] indicates a content (mass %) of the element in the steel, [% symbol of an element*F] indicates a content (mass %) of the element in a ferrite phase, and [% symbol of an element*A] indicates a content (mass %) of the element in the austenitic phase.

2. The ferritic-austenitic duplex stainless steel material according to claim 1, further comprising, in mass %, one of or two or more of
V: 0.001% to 0.5%,
Ti: 0.001% to 0.5%,
Nb: 0.001% to 0.5%,
Zr: 0.001% to 0.5%,
Hf: 0.001% to 0.5%,
W: 0.1% to 3.0%,
Sn: 0.01% to 1.0%,
Co: 0.01% to 1.0%,
Sb: 0.005% to 0.3%,
Ta: 0.001% to 1.0%,
Ga: 0.0002% to 0.3%,
Mg: 0.0002% to 0.01%,
Bi: 0.001% to 1.0%, and
REM: 0.001% to 0.2%.

3. The ferritic-austenitic duplex stainless steel material according to claim 1 or 2, wherein the ferritic-austenitic duplex stainless steel material is used for an in-vehicle channel part having a material temperature of 400 degrees C. or less in use and a part to be joined to the channel part.

4. The ferritic-austenitic duplex stainless steel material according to claim 1 or 2, wherein the ferritic-austenitic duplex stainless steel material is used for a to-be-brazed part.

5. The ferritic-austenitic duplex stainless steel material according to claim 1 or 2, wherein the steel material is in a form of a steel sheet or a steel pipe.

6. A vehicle part made of a material comprising the ferritic-austenitic duplex stainless steel material according to claim 1 or 2.

7. A heat exchanger made of a material comprising the ferritic-austenitic duplex stainless steel material according to claim 1 or 2.

8. A pipe made of a material comprising the ferritic-austenitic duplex stainless steel material according to claim 1 or 2.

9. A channel structure made of a material comprising the ferritic-austenitic duplex stainless steel material according to claim 1 or 2.

10. A method of producing the ferritic-austenitic duplex stainless steel material according to claim 1 or 2, the method comprising final annealing performed at a temperature of 1200 degrees C. or less, wherein
in a temperature-rise process, a time Tu (sec) for a range of 500 degrees C. to 900 degrees C. is 5 seconds to 100 seconds and a time Th (sec) for a range of 900 degrees C. or more is 30 seconds or more,
in a cooling process, a time Td (sec) for a range of 900 degrees C. or 500 degrees C. is 1 second to 400 seconds, and
a formula (III) below is satisfied, $$0.20 \leq (Tu+Td)/Th \leq 10.00 \quad \text{Formula (III)}.$$

11. The ferritic-austenitic duplex stainless steel material according to claim 3, wherein the ferritic-austenitic duplex stainless steel material is used for a to-be-brazed part.

12. The ferritic-austenitic duplex stainless steel material according to claim 3, wherein the steel material is in a form of a steel sheet or a steel pipe.

13. The ferritic-austenitic duplex stainless steel material according to claim 4, wherein the steel material is in a form of a steel sheet or a steel pipe.

14. A method of producing the ferritic-austenitic duplex stainless steel material according to claim 3, the method comprising final annealing performed at a temperature of 1200 degrees C. or less, wherein in a temperature-rise process, a time Tu (sec) for a range of 500 degrees C. to 900 degrees C. is 5 seconds to 100 seconds and a time Th (sec) for a range of 900 degrees C. or more is 30 seconds or more, in a cooling process, a time Td (sec) for a range of 900 degrees C. or 500 degrees C. is 1 second to 400 seconds, and a formula (III) below is satisfied, $$0.20 \leq (Tu+Td)/Th \leq 10.00 \qquad \text{Formula (III)}.$$

15. A method of producing the ferritic-austenitic duplex stainless steel material according to claim 4, the method comprising final annealing performed at a temperature of 1200 degrees C. or less, wherein in a temperature-rise process, a time Tu (sec) for a range of 500 degrees C. to 900 degrees C. is 5 seconds to 100 seconds and a time Th (sec) for a range of 900 degrees C. or more is 30 seconds or more, in a cooling process, a time Td (sec) for a range of 900 degrees C. or 500 degrees C. is 1 second to 400 seconds, and a formula (III) below is satisfied, $$0.20 \leq (Tu+Td)/Th \leq 10.00 \qquad \text{Formula (III)}.$$

16. A method of producing the ferritic-austenitic duplex stainless steel material according to claim 5, the method comprising final annealing performed at a temperature of 1200 degrees C. or less, wherein in a temperature-rise process, a time Tu (sec) for a range of 500 degrees C. to 900 degrees C. is 5 seconds to 100 seconds and a time Th (sec) for a range of 900 degrees C. or more is 30 seconds or more, in a cooling process, a time Td (sec) for a range of 900 degrees C. or 500 degrees C. is 1 second to 400 seconds, and a formula (III) below is satisfied, $$0.20 \leq (Tu+Td)/Th \leq 10.00 \qquad \text{Formula (III)}.$$

\* \* \* \* \*

UNITED STATES PATENT AND TRADEMARK OFFICE
CERTIFICATE OF CORRECTION

PATENT NO. : 10,793,930 B2
APPLICATION NO. : 15/998964
DATED : October 6, 2020
INVENTOR(S) : Atsutaka Hayashi et al.

It is certified that error appears in the above-identified patent and that said Letters Patent is hereby corrected as shown below:

In the Specification

At Column 4, Line 58:
Please change "or 500" to --to 500--.

In the Claims

Claim 10, Column 24, Line 60:
Please change "or 500" to --to 500--.

Claim 14, Column 25, Line 16:
Please change "or 500" to --to 500--.

Claim 15, Column 26, Line 6:
Please change "or 500" to --to 500--.

Claim 16, Column 26, Line 19:
Please change "or 500" to --to 500--.

Signed and Sealed this
First Day of December, 2020

Andrei Iancu
*Director of the United States Patent and Trademark Office*